United States Patent
Cho

(10) Patent No.: US 10,094,314 B2
(45) Date of Patent: Oct. 9, 2018

(54) METHOD OF REGENERATING SELECTIVE CATALYTIC REDUCTION CATALYST ON DIESEL PARTICULATE FILTER AND EXHAUST PURIFICATION SYSTEM

(71) Applicant: HYUNDAI MOTOR COMPANY, Seoul (KR)

(72) Inventor: Ji Ho Cho, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 94 days.

(21) Appl. No.: 15/233,311

(22) Filed: Aug. 10, 2016

(65) Prior Publication Data

US 2017/0159591 A1   Jun. 8, 2017

(30) Foreign Application Priority Data

Dec. 8, 2015 (KR) .................. 10-2015-0174195

(51) Int. Cl.
| | |
|---|---|
| F01N 3/00 | (2006.01) |
| F02D 41/02 | (2006.01) |
| F01N 3/20 | (2006.01) |
| F01N 3/023 | (2006.01) |
| F01N 3/035 | (2006.01) |
| F01N 11/00 | (2006.01) |

(52) U.S. Cl.
CPC .......... *F02D 41/029* (2013.01); *F01N 3/023* (2013.01); *F01N 3/035* (2013.01); *F01N 3/2066* (2013.01); *F01N 11/002* (2013.01)

(58) Field of Classification Search
USPC .......... 60/274, 286, 295, 297, 301, 303, 311
See application file for complete search history.

(56) References Cited

U.S. PATENT DOCUMENTS

| | | | | |
|---|---|---|---|---|
| 7,086,220 B2* | 8/2006 | Imai | ............... | F01N 3/023 60/274 |
| 7,861,519 B2* | 1/2011 | Fritsch | ............ | F01N 3/035 60/274 |
| 8,119,088 B2* | 2/2012 | Boorse | ........... | B01D 53/9418 423/210 |
| 9,133,746 B2* | 9/2015 | Lee | ............... | F01N 3/025 |
| 2011/0265458 A1* | 11/2011 | Barasa | ............ | F01N 3/035 60/286 |
| 2017/0051654 A1* | 2/2017 | Gupta | ............. | F01N 3/035 |
| 2017/0074139 A1* | 3/2017 | Nilsson | .......... | F01N 3/208 |

FOREIGN PATENT DOCUMENTS

| | | |
|---|---|---|
| JP | 2010-031731 A | 2/2010 |
| JP | 4432693 B2 | 3/2010 |
| JP | 2010-071203 A | 4/2010 |
| KR | 10-2015-0059535 A | 6/2015 |

* cited by examiner

*Primary Examiner* — Binh Q Tran
(74) *Attorney, Agent, or Firm* — McDermott Will & Emery LLP

(57) ABSTRACT

A method of regenerating a selective catalytic reduction catalyst on a diesel particulate filter (SDPF) includes predicting a reducing agent amount oxidized in the SDPF during regeneration of the SDPF if the regeneration of the SDPF is necessary; calculating a quantity of heat generated from the reducing agent amount oxidized in the SDPF; calculating a temperature change from the generated quantity of heat; calculating a target temperature when regenerating the SDPF; and performing the regeneration according to the target temperature.

11 Claims, 4 Drawing Sheets

METHOD OF REGENERATING SELECTIVE CATALYTIC REDUCTION CATALYST ON DIESEL PARTICULATE FILTER AND EXHAUST PURIFICATION SYSTEM

CROSS-REFERENCE TO RELATED APPLICATION

This application claims the benefit of priority to Korean Patent Application No. 10-2015-0174195 filed in the Korean Intellectual Property Office on Dec. 8, 2015, the entire content of which is incorporated herein by reference.

TECHNICAL FIELD

The present disclosure relates to a method of regenerating a selective catalytic reduction catalyst on a diesel particulate filter (SDPF) and an exhaust purification system. More particularly, the present disclosure relates to a method of regenerating an SDPF and an exhaust purification system that improves fuel mileage and prevents heat degradation of the SDPF by setting a target temperature of the SDPF considering an oxidation heat of a reducing agent during regeneration of the SDPF.

BACKGROUND

Generally, exhaust gas flowing out from an engine through an exhaust manifold is driven into a catalytic converter mounted at an exhaust pipe and is purified therein. Then, noise of the exhaust gas is decreased while passing through a muffler and then the exhaust gas is emitted into the air through a tail pipe. The catalytic converter purifies pollutants contained in the exhaust gas. In addition, a particulate filter for trapping particulate matter (PM) contained in the exhaust gas is mounted in the exhaust pipe.

A denitrification (DeNOx) catalyst is one type of such a catalytic converter and purifies nitrogen oxide (NOx) contained in the exhaust gas. If reducing agents such as urea, ammonia, carbon monoxide, and hydrocarbon (HC) are supplied to the exhaust gas, the NOx contained in the exhaust gas is reduced in the DeNOx catalyst through oxidation-reduction reaction with the reducing agents.

Recently, a lean NOx trap (LNT) together with a selective catalytic reduction (SCR) catalyst is used to meet enhanced exhaust regulations. The LNT catalyst absorbs the NOx contained in the exhaust gas when air/fuel ratio is lean, and releases the absorbed NOx and reduces the released nitrogen oxide and the nitrogen oxide contained in the exhaust gas when the air/fuel ratio is rich atmosphere.

If the LNT and the SCR catalyst are simultaneously used, however, the SCR catalyst may be coated on a diesel particulate filter due to a limited space. The SCR catalyst on a diesel particulate filter (SDPF) is adapted to trap particulate material (PM) in the exhaust gas and to remove NOx contained in the exhaust gas using a reducing agent. In addition, if the amount of the PM trapped in the SDPF is greater than or equal to a predetermined amount of the PM, a temperature of the exhaust gas is raised and burns and removes the PM trapped in the SDPF. This is called a regeneration of the SDPF.

When the temperature of the exhaust gas is raised above a regeneration temperature to remove the PM trapped in the SDPF, the reducing agent is oxidized (the NOx is reduced) to generate an oxidation heat. The oxidation heat raises the temperature of the SDPF excessively and the SDPF may be damaged.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a method of regenerating an SDPF and an exhaust purification system having advantages of preventing degradation of the SDPF and improving fuel mileage by setting a target temperature of the SDPF considering an oxidation heat of a reducing agent during regeneration of the SDPF.

A method of regenerating a selective catalytic reduction catalyst on a diesel particulate filter (SDPF) according to an exemplary embodiment of the present invention may include: predicting a reducing agent amount oxidized in the SDPF during regeneration of the SDPF if the regeneration of the SDPF is necessary; calculating a quantity of heat generated from the reducing agent amount oxidized in the SDPF; calculating a temperature change from the generated quantity of heat; calculating a target temperature when regenerating the SDPF; and performing the regeneration according to the target temperature.

The reducing agent amount oxidized in the SDPF during regeneration of the SDPF may be predicted from a temperature of the SDPF, a mass flow of the exhaust gas, a mass flow of nitrogen oxide supplied to the SDPF, a reducing agent amount absorbed in the SDPF and a mass of the reducing agent supplied to the SDPF.

The generated quantity of heat may be calculated from a temperature of the SDPF and the reducing agent amount oxidized in the SDPF.

The target temperature when regenerating the SDPF may be calculated by subtracting the temperature change from the generated quantity of heat from a predetermined temperature when regenerating the SDPF.

A fuel injection may be controlled such that an inlet temperature of the SDPF is to be the target temperature at the performing the regeneration according to the target temperature.

An exhaust purification system according to another exemplary embodiment of the present invention may include: an engine including an injector for injecting fuel thereinto, generating power by burning mixture of air and the fuel, and exhausting the exhaust gas generated at combustion process to the exterior thereof through an exhaust pipe; a dosing module mounted on the exhaust pipe downstream of the engine and adapted to directly inject a reducing agent into the exhaust gas; a selective catalytic reduction catalyst on a diesel particulate filter (SDPF) mounted on the exhaust pipe downstream of the dosing module and adapted to trap particulate matter (PM) contained in the exhaust gas and to reduce the nitrogen oxide contained in the exhaust gas using the reducing agent injected through the dosing module; and a controller adapted to perform denitrification using the SDPF or to regenerate the SDPF to remove the PM trapped in the SDPF according to a driving condition of the engine, wherein the controller predicts a reducing agent amount oxidized in the SDPF during regeneration of the SDPF if the regeneration of the SDPF is necessary, calculates a quantity of heat generated from the reducing agent amount oxidized in the SDPF, calculates a target temperature when regenerating the SDPF from the generated quantity of heat, and performs the regeneration according to the target temperature.

The controller may predict the reducing agent amount oxidized in the SDPF during regeneration of the SDPF from a temperature of the SDPF, a mass flow of the exhaust gas, a mass flow of nitrogen oxide supplied to the SDPF, a reducing agent amount absorbed in the SDPF and a mass of the reducing agent supplied to the SDPF.

The controller may calculate the generated quantity of heat from a temperature of the SDPF and the reducing agent amount oxidized in the SDPF.

The controller may calculate the target temperature when regenerating the SDPF by subtracting the temperature change from the generated quantity of heat from a predetermined temperature when regenerating the SDPF.

The controller may control a fuel injection such that an inlet temperature of the SDPF is to be the target temperature.

The exhaust purification system may further include a lean NOx trap (LNT) mounted on the exhaust pipe between the engine and the dosing module, and adapted to absorb nitrogen oxide (NOx) contained in the exhaust gas at a lean air/fuel ratio, to release the absorbed NOx at a rich air/fuel ratio, and to reduce the NOx contained in the exhaust gas or the released NOx.

As described above, the temperature of the SDPF may be prevented from being raised excessively due to the oxidation heat by setting the target temperature of the SDPF to be lowered considering the oxidation heat of the reducing agent during regeneration of the SDPF according to the present disclosure. Therefore, thermal durability of the SDPF may be improved.

In addition, since unnecessary rise in the temperature of the SDPF is prevented, fuel mileage may be improved.

DETAILED DESCRIPTION OF THE EMBODIMENTS

An exemplary embodiment in the present disclosure will hereinafter be described in detail with reference to the accompanying drawings.

Figure 1:
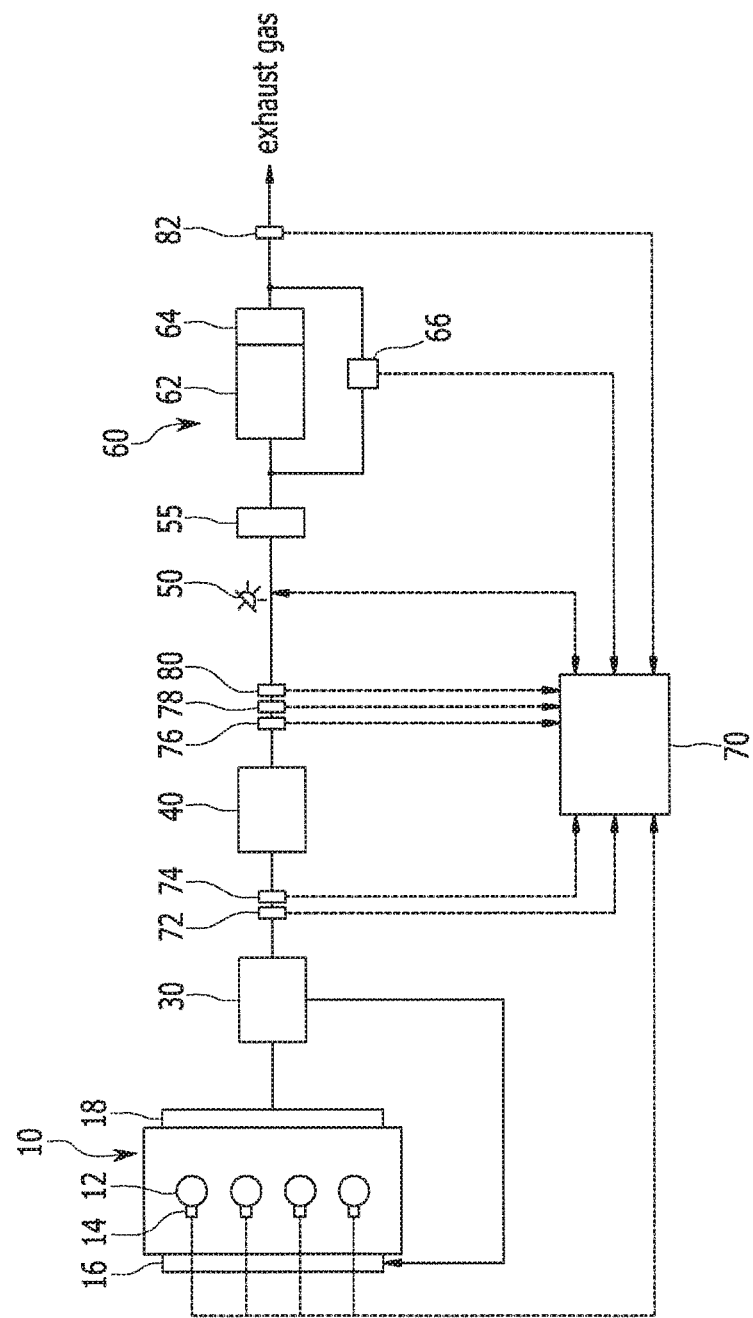
FIG. 1 is a schematic diagram of an exhaust purification system according to an exemplary embodiment in the present disclosure.

FIG. 1 is a schematic diagram of an exhaust purification system according to an exemplary embodiment in the present disclosure.

As shown in FIG. 1, an exhaust system for an internal combustion engine includes an engine 10, an exhaust pipe 20, an exhaust gas recirculation (EGR) apparatus 30, a lean NOx trap (LNT) 40, a dosing module 50, a particulate filter 60, and a controller 70.

The engine 10 burns air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that exhaust gas generated in combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug (not shown) is mounted at an upper portion of the combustion chamber 12. In addition, if a gasoline direct injection (GDI) engine is used, the injector 14 is mounted at the upper portion of the combustion chamber 12.

The exhaust pipe 20 is connected to the exhaust manifold 18 so as to exhaust the exhaust gas to the exterior of a vehicle. The LNT 40, the dosing module 50, and the particulate filter 60 are mounted on the exhaust pipe 20 so as to remove hydrocarbon, carbon monoxide, particulate matter, and nitrogen oxide contained in the exhaust gas.

The exhaust gas recirculation apparatus 30 is mounted on the exhaust pipe 20, and a portion of the exhaust gas exhausted from the engine 10 is supplied back to the engine 10 through the exhaust gas recirculation apparatus 30. In addition, the exhaust gas recirculation apparatus 30 is connected to the intake manifold 16 so as to control combustion temperature by mixing a portion of the exhaust gas with the air. Such control of the combustion temperature is performed by controlling amount of the exhaust gas supplied back to the intake manifold 16 by control of the controller 70. Therefore, a recirculation valve (not shown) controlled by the controller 70 may be mounted on a line connecting the exhaust gas recirculation apparatus 30 and the intake manifold 16.

A first oxygen sensor 72 is mounted on the exhaust pipe 20 downstream of the exhaust gas recirculation apparatus 30. The first oxygen sensor 72 detects oxygen amount in the exhaust gas passing through the exhaust gas recirculation apparatus 30 and transmits a signal corresponding thereto to the controller 70 so as to help lean/rich control of the exhaust gas performed by the controller 70.

In addition, a first temperature sensor 74 is mounted on the exhaust pipe 20 downstream of the exhaust gas recirculation apparatus 30 and detects temperature of the exhaust gas passing through the exhaust gas recirculation apparatus 30.

The LNT 40 is mounted on the exhaust pipe 20 downstream of the exhaust gas recirculation apparatus 30. The LNT 40 absorbs the nitrogen oxide (NOx) contained in the exhaust gas at a lean air/fuel ratio, and releases the absorbed nitrogen oxide and reduces the nitrogen oxide contained in the exhaust gas or the released nitrogen oxide at a rich air/fuel ratio. In addition, the LNT 40 may oxidize carbon monoxide (CO) and hydrocarbon (HC) contained in the exhaust gas.

Herein, the hydrocarbon represents all compounds consisting of carbon and hydrogen contained in the exhaust gas and the fuel.

A second oxygen sensor 76, a second temperature sensor 78, and a first NOx sensor 80 are mounted on the exhaust pipe 20 downstream of the LNT 40.

The second oxygen sensor 76 detects oxygen amount contained in exhaust gas flowing into the particulate filter 60 and transmits a signal corresponding thereto to the controller 70. The controller 70 may perform the lean/rich control of the exhaust gas based on the detected values by the first oxygen sensor 72 and the second oxygen sensor 76. In this specification, the detected value by the second oxygen sensor 62 is called air/fuel ratio (lambda) at a downstream of the LNT.

The second temperature sensor 78 detects temperature of the exhaust gas flowing into the particulate filter 60 and transmits a signal corresponding thereto to the controller 70.

The first NOx sensor 80 detects NOx amount contained in the exhaust gas flowing into the particulate filter 60 and transmits a signal corresponding thereto to the controller 70. The NOx amount detected by the first NOx sensor 80 may be used to determine amount of reducing agent injected by the dosing module 50.

The dosing module 50 is mounted on the exhaust pipe 20 upstream of the particulate filter 60 and injects the reducing agent into the exhaust gas by control of the controller 70. Typically, the dosing module 50 injects urea and the injected urea is hydrolyzed and converted into ammonia. However, the reducing agent is not limited to the ammonia.

A mixer 55 is mounted on the exhaust pipe 20 downstream of the dosing module 50 and mixes the reducing agent and the exhaust gas evenly.

The particulate filter 60 is mounted on the exhaust pipe 20 downstream of the mixer 55, traps particulate matter contained in the exhaust gas, and reduces the nitrogen oxide contained in the exhaust gas using the reducing agent injected by the dosing module 50. For these purposes, the particulate filter 60 includes a selective catalytic reduction (SCR) catalyst on a diesel particulate filter (SDPF) 62 and an additional selective catalytic reduction (SCR) catalyst 64, but is not limited thereto. For example, the particulate filter 60 can include only the SDPF 62.

The SDPF 62 is formed by coating the SCR catalyst on walls defining channels of the DPF. Generally, the DPF includes a plurality of inlet channels and outlet channels. Each of the inlet channels includes an end that is open and the other end that is blocked, and receives the exhaust gas from a front end of the DPF. In addition, each of the outlet channels includes an end that is blocked and the other end that is open, and discharges the exhaust gas from the DPF. The exhaust gas flowing into the DPF through the inlet channels enters the outlet channels through porous walls separating the inlet channels and the outlet channels. After that, the exhaust gas is discharged from the DPF through the outlet channels. When the exhaust gas passes through the porous walls, the particulate matter contained in the exhaust gas is trapped. In addition, the SCR catalyst coated on the SDPF 62 reduces the nitrogen oxide contained in the exhaust gas using the reducing agent injected by the dosing module 50.

The additional SCR 64 is mounted at the rear of the SDPF 62. The additional SCR 64 further reduces the nitrogen oxide if the SDPF 62 purifies the nitrogen oxide completely. The additional SCR catalyst 64 may be physically isolated from the SDPF 62. In addition, the additional SCR catalyst 64 may be a passive SCR catalyst.

A pressure difference sensor 66 is mounted on the exhaust pipe 20. The pressure difference sensor 66 detects pressure difference between a front end portion and a rear end portion of the particulate filter 60 (or SDPF 62), and transmits a signal corresponding thereto to the controller 70. The controller 70 may control the particulate filter 60 (or SDPF 62) to be regenerated if the pressure difference detected by the pressure difference sensor 66 is greater than predetermined pressure. In this case, the injector 14 post-injects the fuel so as to raise the temperature of the exhaust gas and burn the PM trapped in the particulate filter 60.

In addition, a second NOx sensor 82 is mounted on the exhaust pipe 20 downstream of the particulate filter 60. The second NOx sensor 82 detects amount of the nitrogen oxide contained in the exhaust gas exhausted from the particulate filter 60, and transmits a signal corresponding thereto to the controller 70. The controller 70 can check based on the detected value by the second NOx sensor 82 whether the nitrogen oxide contained in the exhaust gas is normally removed in the particulate filter 60. That is, the second NOx sensor 82 may be used to evaluate performance of the particulate filter 60.

The controller 70 determines a driving condition of the engine based on the signals transmitted from each sensor, and performs the leans/rich control and controls the amount of the reducing agent injected by the dosing module 50 based on the driving condition of the engine. For example, the controller 70 releases the NOx from the LNT 40 by causing the air/fuel ratio to be rich, reduces the released nitrogen oxide by using the reducing agent contained in the exhaust gas, and removes the NOx at the SDPF 62 by injecting the reducing agent. The lean/rich control may be performed by controlling fuel is amount injected by the injector 14 and injection timing.

A plurality of maps, characteristic of the LNT/SDPF and corrections coefficients are stored in the controller 70, and the controller can calculate a reducing agent amount absorbed in the SDPF 62, a reducing agent amount oxidized in the SDPF 62, and a heat generation according to the oxidized reducing agent amount based on the plurality of maps, characteristic of the LNT/SDPF and corrections coefficients. The plurality of maps, characteristics of the LNT/SDPF and correction coefficients are determined through various experiments.

In addition, the controller 70 controls regeneration of the SDPF 62 and desulfurization of the LNT 40.

The controller 70 can be realized by one or more processors activated by predetermined program, and the predetermined program can be programmed to perform each step of a method of regenerating an SDPF according to the present disclosure.

Figure 2:
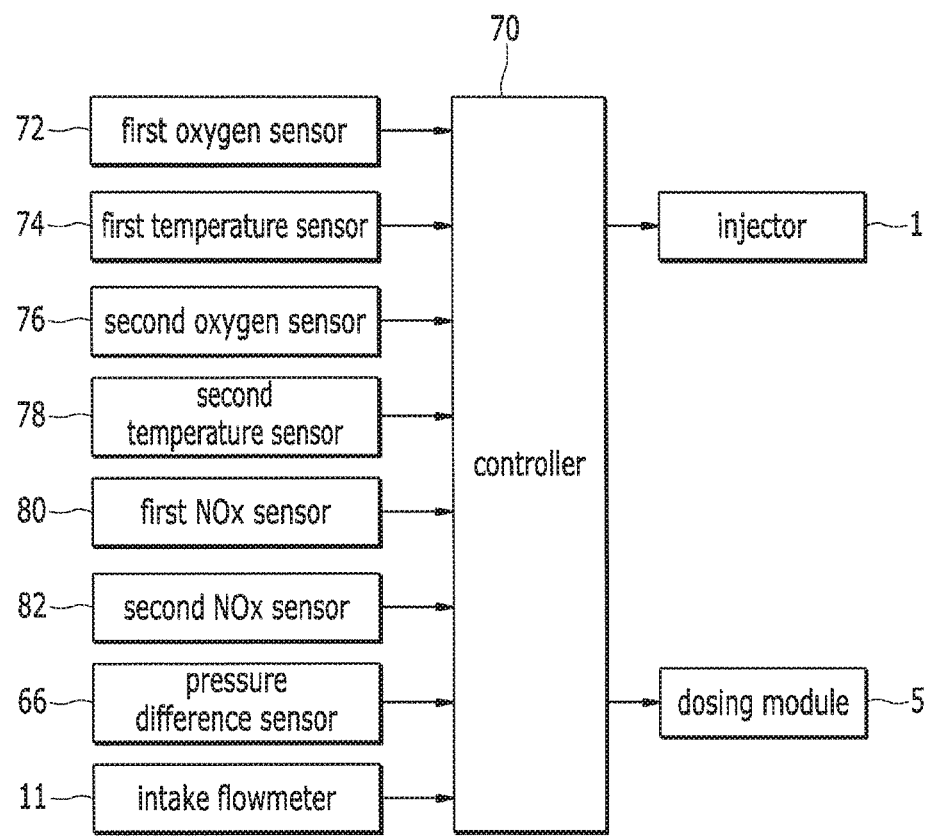
FIG. 2 is a block diagram illustrating a relationship of an input and output of a controller used in a method of regenerating an SDPF in an exhaust purification system according to an exemplary embodiment in the present disclosure.

FIG. 2 is a block diagram illustrating a relationship of an input and output of a controller used in a method of regenerating an SDPF in an exhaust purification system according to an exemplary embodiment in the present disclosure.

As shown in FIG. 2, the first oxygen sensor 72, the first temperature sensor 74, the second oxygen sensor 76, the second temperature sensor 78, the first NOx sensor 80, the second NOx sensor 82, the pressure difference sensor 66 and an intake flowmeter 11 are electrically connected to the controller 70, and transmit the detected values to the controller 70.

The first oxygen sensor 72 detects the oxygen amount in the exhaust gas passing through the exhaust gas recirculation apparatus 30 and transmits the signal corresponding thereto to the controller 70. The controller 70 may perform the lean/rich control of the exhaust gas based on the oxygen amount in the exhaust gas detected by the first oxygen sensor 72. The detected value by the first oxygen sensor 72 may be represented as lambda (λ). The lambda means a ratio of actual air/fuel ratio to stoichiometric air/fuel ratio. If the lambda is greater than 1, the air/fuel ratio is lean. On the contrary, the air/fuel ratio is rich if the lambda is smaller than 1.

The first temperature sensor 74 detects the temperature of the exhaust gas passing through the exhaust gas recirculation apparatus 30 and transmits the signal corresponding thereto to the controller 70.

The second oxygen sensor 76 detects the oxygen amount in the exhaust gas flowing into the SDPF 62 and transmits the signal corresponding thereto to the controller 70.

The second temperature sensor 78 detects the temperature of the exhaust gas flowing into the SDPF 62 (inlet temperature of the SDPF) and transmits the signal corresponding thereto to the controller 70.

The first NOx sensor 80 detects the NOx amount contained in the exhaust gas flowing into the SDPF 62 and transmits the signal corresponding thereto to the controller 70.

The second NOx sensor 82 detects the NOx amount contained in the exhaust gas exhausted from the particulate filter 60 and transmits the signal corresponding thereto to the controller 70.

The pressure difference sensor 66 detects the pressure difference between a front end portion and a rear end portion of the SDPF 62 and transmits the signal corresponding thereto to the controller 70.

The intake flowmeter 11 detects an intake air flow supplied to an intake system of the engine 10 and transmits the signal corresponding thereto to the controller 70.

The controller 70 determines the driving condition of the engine, fuel injection amount, fuel injection timing, fuel injection pattern, injection amount of the reducing agent, regeneration timing of the SDPF 62, and desulfurization/regeneration timing of the LNT 40 based on the transmitted value, and outputs a signal for controlling the injector 14 and the dosing module 50 to the injector 14 and the dosing module 50. In addition, the controller 70 calculates oxidation heat of the reducing agent generated during the regeneration of the SDPF 62 on the basis of the transmitted value.

A plurality of sensors other than the sensors illustrated in FIG. 2 may be mounted in the exhaust purification system according to the exemplary embodiment of the present invention. For better comprehension and ease of description, however, description of the plurality of sensors will be omitted.

Herein, referring to FIG. 3, a method of regenerating an SDPF according to an exemplary embodiment in the present disclosure will be described in detail.

Figure 3:
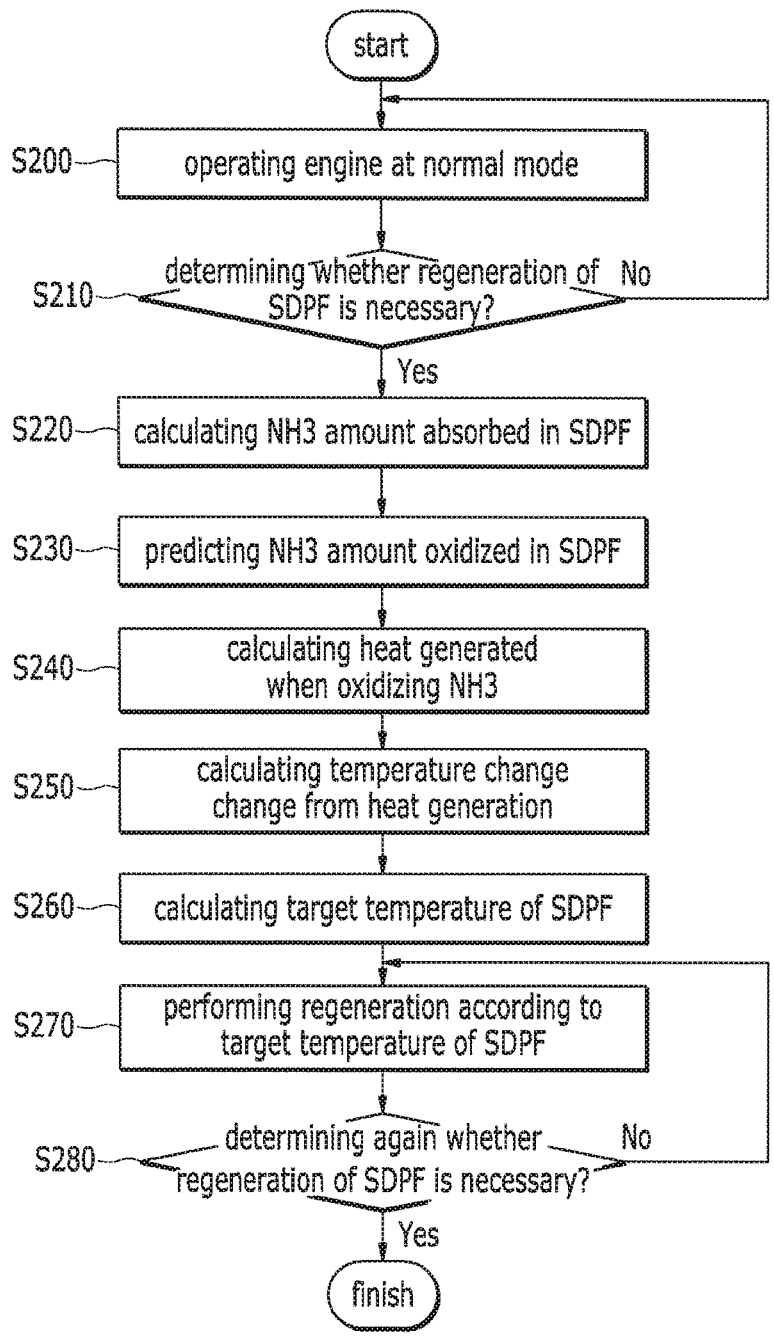
FIG. 3 is a flowchart of a method of regenerating an SDPF according to an exemplary embodiment in the present disclosure.

FIG. 3 is a flowchart of a method of regenerating an SDPF according to an exemplary embodiment in the present disclosure. It is exemplified in FIG. 3 but is not limited to that ammonia (NH3) is used as the reducing agent.

As shown in FIG. 3, in a state that the engine 10 is operated at a normal mode at step S200, the controller 70 determines whether the regeneration of the SDPF 62 is necessary at step S210. The normal mode is a mode that is not the LNT regeneration mode, the LNT desulfurization mode, the SDPF regeneration mode, and the SDPF desulfurization mode. In addition, if the pressure difference between the front end portion and the rear end portion of the SDPF 62 detected by the pressure difference sensor 66 is larger than or equal to a first predetermined pressure, the controller 70 determines that the regeneration of the SDPF 62 is necessary.

If it is determined that the regeneration of the SDPF 62 is not required at the step S210, the controller 70 returns to the step S200 and causes the engine 10 to continuously operate at the normal mode.

If it is determined that the regeneration of the SDPF 62 is necessary at the step S210, the controller 70 calculates an amount of the NH3 absorbed in the SDPF 62 at step S220. The amount of the NH3 absorbed in the SDPF 62 may be calculated from an amount of NH3 that was absorbed in the SDPF 62 prior to a previous NH3 injection, an amount of the previous NH3 injection by the dosing module 50, and an amount of NH3 oxidized in the SDPF 62 by the previous NH3 injection. In addition, the amount of NH3 oxidized in the SDPF 62 by the previous NH3 injection may be calculated from a temperature of the SDPF 62 at the previous NH3 injection, a mass flow of the exhaust gas at the previous NH3 injection, a mass flow of the nitrogen oxide supplied to the SDPF 62 at the previous NH3 injection, an amount of NH3 absorbed in the SDPF 62 at the previous NH3 injection, and a mass of the NH3 supplied to the SDPF 62 due to the previous NH3 injection. Herein, a mass flow means a mass per unit time. The mass is calculated by integrating the mass flow over a time.

In addition, the controller 70 predicts an amount of the NH3 oxidized in the SDPF 62 during the regeneration of the SDPF 62 at step S230. Even though the SDPF 62 is regenerated, the NH3 can be oxidized in the SDPF 62 and the NOx contained in the exhaust gas can be reduced. At this process, an it internal temperature of the SDPF 62 rises due to an oxidation heat of the NH3. Therefore, in order to predict a temperature rise of the SDPF 62, the amount of the NH3 oxidized in the SDPF 62 is predicted. The amount of the NH3 oxidized in the SDPF 62 during the regeneration of the SDPF 62 may be predicted from the temperature of the SDPF 62, the mass flow of the exhaust gas, the mass flow of the NOx supplied to the SDPF 62, the amount of NH3 absorbed in the SDPF 62 calculated at the step S220, and the mass of the NH3 supplied to the SDPF 62. The mass flow of the NH3 supplied to the SDPF 62 may be calculated by subtracting a mass flow of the NOx removed from the LNT40 from a mass flow of the NOx generated according to the driving condition of the engine nitrogen oxide, and the mass flow of the NH3 supplied to the SDPF 62 may be calculated from a mass flow of the NH3 contained in the exhaust gas discharged from the LNT 40 and an amount of the NH3 injected by the dosing module 50.

Then, the controller 70 calculates a quantity of heat generated when oxidizing the NH3 from the amount of the NH3 oxidized in the SDPF 62 during the regeneration of the SDPF 62 at step S240. Generally, a low heating value (LVH) of the NH3 is 18.6 MJ/Kg and LVH of a diesel fuel is 42.8 MJ/Kg, That is, the LVH of the NH3 is 43% of the LVH of the diesel fuel. Therefore, the quantity of heat generated when oxidizing the NH3 may be calculated from the temperature of the SDPF 62 and the amount of the NH3 oxidized in the SDPF 62.

Then, the controller 70 calculates a temperature change of the SDPF 62 from the quantity of heat generated when oxidizing the NH3 at step S250. The temperature change of the SDPF 62 may be calculated from the temperature of the SDPF 62, the quantity of heat generated when oxidizing the NH3, a volume of the SDPF 62, and the mass flow of the exhaust gas.

If the temperature change of the SDPF 62 is calculated, the controller 70 calculates a target temperature when regenerating the SDPF 62 at step S260. The target temperature when regenerating the SDPF 62 is calculated by subtracting the temperature change according to the generated quantity of heat from a predetermined temperature when regenerating the SDPF 62. That is, the predetermined temperature when regenerating the SDPF 62 is subtracted by the temperature rise due to the oxidation heat of the NH3. Herein, the predetermined temperature when regenerating the SDPF 62 is a temperature necessary to regenerate the SDPF 62 and is preset. Even though the target temperature of the SDPF 62 is lowered than the predetermined temperature when regenerating the SDPF 62, the temperature of the SDPF 62 rises to the predetermined temperature when regenerating the SDPF 62 due to the oxidation heat of the NH3. In addition, if the target temperature of the SDPF 62 when regeneration is lowered, a temperature rise due to the injection of the fuel is also lowered and fuel consumption may be lowered.

Then, the controller 70 performs the regeneration of the SDPF 62 according to the target temperature when regenerating the SDPF 62 at step S270. That is, the controller 70 controls the fuel injection such that the inlet temperature of the SDPF 62 is to be the target temperature.

Finally, the controller 70 determines again whether the regeneration of the SDPF 62 is necessary at step S280. That is, if the pressure difference between the front end portion and the rear end portion of the SDPF 62 detected by the pressure difference sensor 66 is smaller than a second predetermined pressure, the controller 70 determines that the regeneration of the SDPF 62 is not necessary. Herein, the second predetermined pressure may be lower than the first predetermined pressure.

If the regeneration of the SDPF 62 is necessary at the step S280, the controller 70 returns to the step S270 and continuously perform the regeneration of the SDPF 62.

If the regeneration of the SDPF 62 is not necessary at the step S280, the controller 70 finishes the method of regenerating the SDPF according to the exemplary embodiment of the present invention, and controls the engine 10 to operate at the normal mode.

Figure 4:
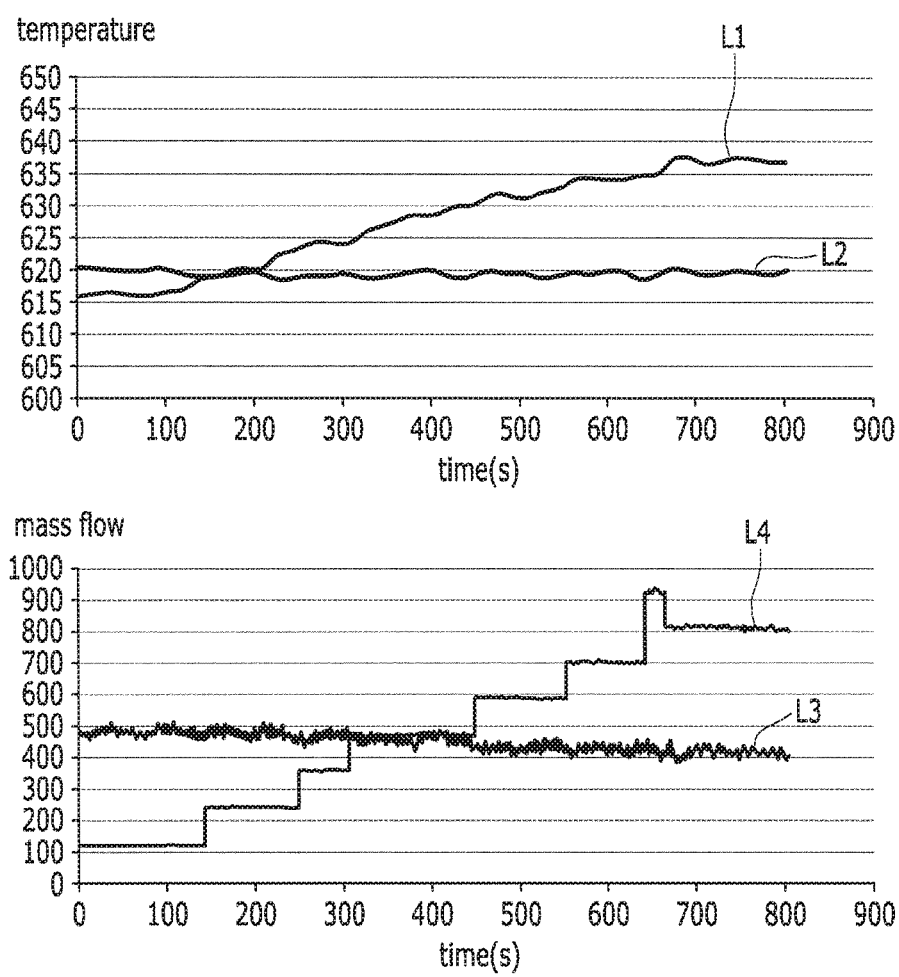
FIG. 4 is a graph illustrating a temperature rise in an SDPF according to an injection amount of urea.

FIG. 4 is a graph illustrating a temperature rise in an SDPF according to an injection amount of urea.

In FIG. 4, L1 represents an internal temperature of the SDPF 62 and L2 represents the inlet temperature of the SDPF 62. In addition, L3 represents the fuel injection and L4 represents the NH3 amount injected by the dosing module 50.

As shown in FIG. 4, since the fuel injection does not increase, the inlet temperature of the SDPF 62 is maintained to be constant. However, as the injection amount of the NH3 increases, the internal temperature of the SDPF 62 rises proportionally. That is, the graph in FIG. 4 shows that the oxidation heat of the NH3 should be considered when setting the target temperature of the SDPF 62. According to the exemplary embodiment of the present invention, the target temperature of the SDPF 62 is set by considering the oxidation heat of the NH3. Therefore, excessive temperature rise of the SDPF 62 may be prevented. Therefore, thermal durability of the SDPF 62 may be improved.

In addition, since unnecessary temperature rise of the SDPF 62 is prevented, fuel mileage may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of regenerating a selective catalytic reduction catalyst on a diesel particulate filter (SDPF), the method comprising:
predicting, by a controller, a reducing agent amount oxidized in the SDPF during regeneration of the SDPF if the regeneration of the SDPF is necessary;
calculating, by the controller, a quantity of heat generated from the reducing agent amount oxidized in the SDPF;
calculating, by the controller, a temperature change from the generated quantity of heat;
calculating, by the controller, a target temperature when regenerating the SDPF; and
performing, by the controller, the regeneration according to the target temperature,
wherein the reducing agent amount oxidized in the SDPF during regeneration of the SDPF is predicted from a temperature of the SDPF, a mass flow of the exhaust gas, a mass flow of nitrogen oxide supplied to the SDPF, a reducing agent amount absorbed in the SDPF, and a mass of the reducing agent supplied to the SDPF.

2. The method of claim 1, wherein the generated quantity of heat is calculated from the temperature of the SDPF and the reducing agent amount oxidized in the SDPF.

3. The method of claim 1, wherein the target temperature when regenerating the SDPF is calculated by subtracting the temperature change from the generated quantity of heat from a predetermined temperature when regenerating the SDPF.

4. The method of claim 1, wherein a fuel injection is controlled such that an inlet temperature of the SDPF becomes the target temperature at the performing the regeneration according to the target temperature.

5. An exhaust purification system comprising:
an engine including an injector for injecting a fuel thereinto, generating power by burning a mixture of air and the fuel, and exhausting exhaust gas generated during a combustion process to an exterior thereof through an exhaust pipe;
a dosing module mounted on an exhaust pipe downstream of the engine and directly injecting a reducing agent into the exhaust gas;
a selective catalytic reduction catalyst on a diesel particulate filter (SDPF) mounted on the exhaust pipe downstream of the dosing module and the selective catalytic reduction catalyst trapping a particulate matter (PM) contained in the exhaust gas and to reduce the nitrogen oxide contained in the exhaust gas using the reducing agent injected through the dosing module; and
a controller configured to perform denitrification using the SDPF,
wherein the controller predicts a reducing agent amount oxidized in the SDPF during regeneration of the SDPF if the regeneration of the SDPF is necessary, calculates a quantity of heat generated from the reducing agent amount oxidized in the SDPF, calculates a target temperature when regenerating the SDPF from the generated quantity of heat, and performs the regeneration according to the target temperature, and
wherein the controller predicts the reducing agent amount oxidized in the SDPF during regeneration of the SDPF from a temperature of the SDPF, a mass flow of the exhaust gas, a mass flow of nitrogen oxide supplied to the SDPF, a reducing agent amount absorbed in the SDPF, and a mass of the reducing agent supplied to the SDPF.

6. The exhaust purification system of claim 5, wherein the controller calculates the generated quantity of heat from the temperature of the SDPF and the reducing agent amount oxidized in the SDPF.

7. The exhaust purification system of claim 5, wherein the controller calculates the target temperature when regenerating the SDPF by subtracting the temperature change from the generated quantity of heat from a predetermined temperature when regenerating the SDPF.

8. The exhaust purification system of claim 5, wherein the controller controls a fuel injection such that an inlet temperature of the SDPF becomes the target temperature.

9. The exhaust purification system of claim 5, further comprising a lean NOx trap (LNT) mounted on the exhaust pipe between the engine and the dosing module, and the LBT absorbing nitrogen oxide (NOx) contained in the exhaust gas at a lean air/fuel ratio, to release the absorbed NOx at a rich air/fuel ratio, and reducing the NOx contained in the exhaust gas.

10. The exhaust purification system of claim 5, wherein the controller is further configured to regenerate the SDPF to remove the PM trapped in the SDPF according to a driving condition of the engine.

11. The exhaust purification system of claim 5, the LBT further reduces the NOx contained in the released NOx.

* * * * *